(12) United States Patent
Yang et al.

(10) Patent No.: US 11,176,564 B2
(45) Date of Patent: Nov. 16, 2021

(54) LOCATION INFORMATION PROCESSING METHOD AND APPARATUS

(71) Applicant: ADVANCED NEW TECHNOLOGIES CO., LTD., Grand Cayman (KY)

(72) Inventors: Weijia Yang, Hangzhou (CN); Tengfei Liu, Hangzhou (CN); Wei Xia, Hangzhou (CN); Qing Lu, Hangzhou (CN); Tao Chen, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/889,269

(22) Filed: Jun. 1, 2020

(65) Prior Publication Data
US 2020/0294074 A1    Sep. 17, 2020

Related U.S. Application Data

(63) Continuation of application No. PCT/CN2018/124298, filed on Dec. 27, 2018.

(30) Foreign Application Priority Data

Jan. 12, 2018    (CN) .......................... 201810030394.3

(51) Int. Cl.
*G06Q 30/02*    (2012.01)
*G06F 16/28*    (2019.01)
*G06F 16/29*    (2019.01)

(52) U.S. Cl.
CPC ....... *G06Q 30/0205* (2013.01); *G06F 16/285* (2019.01); *G06F 16/29* (2019.01)

(58) Field of Classification Search
None
See application file for complete search history.

(56) References Cited

U.S. PATENT DOCUMENTS

| | | | |
|---|---|---|---|
| 6,640,145 B2 | 10/2003 | Hoffberg et al. |
| 7,974,714 B2 | 7/2011 | Hoffberg |
| 8,031,060 B2 | 10/2011 | Hoffberg et al. |
| 8,751,829 B2 | 6/2014 | Vysogorets et al. |

(Continued)

FOREIGN PATENT DOCUMENTS

| | | |
|---|---|---|
| CN | 103714138 A | 4/2014 |
| CN | 103714153 A | 4/2014 |

(Continued)

OTHER PUBLICATIONS

Wikipedia, https://web.archive.org/web/20160126143159/https://en.wikipedia.org/wiki/Entropy_%28information_theory%29 (Year: 2016).*

(Continued)

*Primary Examiner* — Akosua Kyereme-Tuah

(57) ABSTRACT

Systems, methods, and storage media for location information processing are disclosed. An example of a method comprises: obtaining transaction information from user terminals of a plurality of users using a service provided by a service provider, the transaction information comprising a plurality of pieces of location information of the user terminals; clustering, using an algorithm, the plurality of pieces of location information into a plurality of areas; determining a transaction attribute corresponding to each area in the plurality of areas, the transaction attribute comprising a number of users in a corresponding area and a number of transactions of users using the service in the corresponding area; determining, according to information entropy values of the transaction attributes, a dispersity of the service provided by the service provider according to a (Continued)

number of areas in the plurality of areas and a plurality of transaction attributes corresponding to the plurality of areas.

20 Claims, 3 Drawing Sheets

(56) References Cited

U.S. PATENT DOCUMENTS

| | | | |
|---|---|---|---|
| 8,752,153 B2 | 6/2014 | Vysogorets et al. | |
| 9,413,712 B2 | 8/2016 | Anderson et al. | |
| 9,418,115 B2 | 8/2016 | Ganick et al. | |
| 9,601,943 B2 | 3/2017 | Partovi | |
| 9,672,535 B2 | 6/2017 | Higgins | |
| 9,734,169 B2 | 8/2017 | Redlich et al. | |
| 9,769,616 B1 | 9/2017 | Pao et al. | |
| 2004/0199623 A1* | 10/2004 | Houri | H04L 67/18 709/223 |
| 2010/0121701 A1* | 5/2010 | Nguyen | G06Q 20/204 705/14.38 |
| 2013/0191213 A1 | 7/2013 | Beck et al. | |
| 2013/0281115 A1 | 10/2013 | Dupray et al. | |
| 2014/0279311 A1 | 9/2014 | Just | |
| 2014/0303807 A1 | 10/2014 | Addepalli et al. | |
| 2014/0310516 A1 | 10/2014 | O'Hare et al. | |
| 2015/0327007 A1* | 11/2015 | Li | H04L 61/6022 455/456.1 |
| 2015/0345969 A1 | 12/2015 | Mcgavran et al. | |
| 2016/0241338 A1 | 8/2016 | Ganick et al. | |
| 2017/0055130 A1 | 2/2017 | LeBlanc et al. | |
| 2017/0318430 A1 | 11/2017 | Ganti et al. | |
| 2017/0330163 A1 | 11/2017 | Fomitchev et al. | |
| 2018/0288568 A1* | 10/2018 | Pao | H04W 4/021 |
| 2019/0026781 A1* | 1/2019 | Beck | G07G 1/0045 |

FOREIGN PATENT DOCUMENTS

| | | |
|---|---|---|
| CN | 103902636 A | 7/2014 |
| CN | 106529998 A | 3/2017 |
| CN | 106682811 A | 5/2017 |
| CN | 108269087 A | 7/2018 |

OTHER PUBLICATIONS

Wikipedia, https://web.archive.org/web/20161227233610/https://en.wikipedia.org/wiki/Decision_tree_learning (Year: 2016).*
International Search Report and Written Opinion for Application No. PCT/CN2018/124298, dated Mar. 29, 2019, 10 pages.
Wikipedia, Entropy (information theory), https://en.wikipedia.org/wiki/Entropy_(information theory), downloaded Aug. 25, 2020, pp. 1-16.
Wikipedia, Decision tree learning, Metrics—Gini impurity, https://en.wikipedia.org/wiki/Decision_tree_learning#Gini_impurity, downloaded Aug. 25, 2020, pp. 1-11.
First Search dated Jan. 17, 2020, issued in related Chinese Application No. 201810030394.3 (1 page).
First Office Action dated Feb. 3, 2020, issued in related Chinese Application No. 201810030394.3, with English machine translation (13 pages).
Second Office Action dated Jun. 1, 2020, issued in related Chinese Application No. 201810030394.3, with English machine translation (8 pages).
PCT International Preliminary Report on Patentability dated Jul. 23, 2020, issued in related International Application No. PCT/CN2018/124298, with English machine translation (12 pages).
Search Report dated Oct. 4, 2019, issued in Taiwan Application No. 107143887 (1 page).
Search Report for European Application No. 18 900 296.7 dated Jan. 25, 2021.
Written Opinion for Singaporean Application No. 11202006203Q dated Aug. 2, 2021.

* cited by examiner

LOCATION INFORMATION PROCESSING METHOD AND APPARATUS

CROSS REFERENCE TO RELATED APPLICATIONS

The present application is a continuation application of PCT Application No. PCT/CN2018/124298 filed Dec. 27, 2018, which is based on and claims priority to Chinese Patent Application No. 201810030394.3, filed on Jan. 12, 2018. All of the above-identified applications are incorporated herein by reference in their entirety.

TECHNICAL FIELD

Multiple embodiments disclosed by the specification relate to the technical field of the Internet, and in particular, to a method and an apparatus for location information processing.

BACKGROUND

Along with the development of the Internet technologies, people make payments increasingly more often by scanning codes in the process of using services provided by merchants. There are typically two types of payments through scanning codes, i.e., one is that a merchant uses a code scanner to scan a user's two-dimensional code/barcode, and the other one is that a user uses a terminal to scan a merchant's two-dimensional code.

Typically, an offline merchant is required to use a merchant two-dimensional code only at a brick and mortar store. However, some offline merchants are still using merchant two-dimensional codes in an illegal manner. For example, the merchant two-dimensional codes are used at online stores. Therefore, to urge offline merchants to use merchant two-dimensional codes in a legal manner, a reliable method needs to be provided for identifying the real environment of an offline merchant using a merchant two-dimensional code.

SUMMARY

The specification describes a location information processing method, comprising clustering location information of users in transaction information into at least one area, and determining a service dispersity of the service provided by an offline service provider according to the number of areas and transaction attributes corresponding to respective areas, thereby achieving efficient and reliable identification of the real environment of an offline service provider using a payment two-dimensional code thereof.

In some embodiments, a location information processing method is provided, comprising: obtaining transaction information of a plurality of users using a service provided by a service provider, the transaction information comprising a plurality of pieces of location information of the plurality of users; clustering the plurality of pieces of location information into at least one area; determining a transaction attribute corresponding to each area in the at least one area, the transaction attribute comprising the number of users in a corresponding area and/or the number of transactions of users using the service in the corresponding area; and determining a service dispersity of the service provided by the service provider according to the number of areas in the at least one area and the transaction attributes corresponding to respective areas.

In one embodiment, the obtaining transaction information of a plurality of users using a service provided by a service provider comprises: obtaining transaction information of the plurality of users using a service provided by the service provider within a pre-determined period.

In one embodiment, before the clustering the plurality of pieces of location information into at least one area, the method further comprises: removing location information exceeding a pre-determined range from the plurality of pieces of location information.

In one embodiment, the clustering the plurality of pieces of location information into at least one area comprises: using the GEOHASH algorithm or DBSCAN algorithm to cluster the plurality of pieces of location information into at least one area.

In one embodiment, the determining a service dispersity of the service provided by the service provider comprises: determining, according to information entropy values of the transaction attributes, the service dispersity of the service provided by the service provider.

In one embodiment, the determining a service dispersity of the service provided by the service provider comprises determining the service using the following equation:

$$\text{Spread}(b_i) = \frac{\sum_{i=1}^{m} -\frac{b_i}{\sum_{j=1}^{m} b_j} * \ln\left(\frac{b_i}{\sum_{j=1}^{m} b_j}\right)}{\ln(m)}$$

where $\text{Spread}(b_i)$ represents the service dispersity, i, j=1, ..., m, m represents the number of areas, $b_i$ represents a transaction attribute corresponding to the $i^{th}$ area, and $b_j$ represents a transaction attribute corresponding to the $j^{th}$ area.

In one embodiment, the determining a service dispersity of the service provided by the service provider comprises determining the service dispersity using the following equation:

$$\text{Spread}(b_i) = \frac{1 - \sum_{i=1}^{m} \left(\frac{b_i}{\sum_{j=1}^{m} b_j}\right)^2}{1 - \frac{1}{m}}$$

where $\text{Spread}(b_i)$ represents the service dispersity, i, j=1, ..., m, m represents the number of areas, $b_i$ represents a transaction attribute corresponding to the $i^{th}$ area, and $b_j$ represents a transaction attribute corresponding to the $j^{th}$ area.

In one embodiment, the location information comprises latitude and longitude information.

In some embodiments, a location information processing apparatus is provided, comprising: an obtaining unit configured to obtain transaction information of a plurality of users using a service provided by a service provider, the transaction information comprising a plurality of pieces of location information of the plurality of users; a clustering unit configured to cluster the plurality of pieces of location information into at least one area; a determining unit configured to determine a transaction attribute corresponding to each area in the at least one area, the transaction attribute comprising the number of users in a corresponding area and/or the number of transactions of users using the service in the corresponding area; and a processing unit configured to determine a service dispersity of the service provided by the service provider according to the number of areas in the at least one area and the transaction attributes corresponding to respective areas.

In one embodiment, the obtaining unit is configured to, for example, obtain transaction information of the plurality of users using a service provided by the service provider within a pre-determined period.

In one embodiment, the apparatus further comprises: a removing unit configured to remove location information exceeding a pre-determined range from the plurality of pieces of location information.

In one embodiment, the clustering unit is configured to, for example, use the GEOHASH algorithm or DBSCAN algorithm to cluster the plurality of pieces of location information into at least one area.

In one embodiment, the processing unit is configured to, for example, determine, according to information entropy values of the transaction attributes, the service dispersity of the service provided by the service provider.

In one embodiment, the processing unit is configured to determine the service dispersity using the following equation:

$$\text{Spread}(b_i) = \frac{\sum_{i=1}^{m} -\frac{b_i}{\sum_{j=1}^{m} b_j} * \ln\left(\frac{b_i}{\sum_{j=1}^{m} b_j}\right)}{\ln(m)}$$

where $\text{Spread}(b_i)$ represents the service dispersity, $i, j=1, \ldots, m$, $m$ represents the number of areas, $b_i$ represents a transaction attribute corresponding to the $i^{th}$ area, and $b_j$ represents a transaction attribute corresponding to the $j^{th}$ area.

In one embodiment, the processing unit is configured to determine the service dispersity using the following equation:

$$\text{Spread}(b_i) = \frac{1 - \sum_{i=1}^{m} \left(\frac{b_i}{\sum_{j=1}^{m} b_j}\right)^2}{1 - \frac{1}{m}}$$

where $\text{Spread}(b_i)$ represents the service dispersity, $i, j=1, \ldots, m$, $m$ represents the number of areas, $b_i$ represents a transaction attribute corresponding to the $i^{th}$ area, and $b_j$ represents a transaction attribute corresponding to the $j^{th}$ area.

In one embodiment, the location information obtained by the obtaining unit comprises latitude and longitude information.

In some embodiments, a computer readable storage medium is provided, which stores a computer program, and the computer program, when executed in a computer, causes the computer to implement the method according to any one of the implementations in the first aspect above.

In some embodiments, a computing device is provided, comprising a memory and a processor, the memory storing executable code, and the processor, when executing the executable code, implementing the method according to any one of the implementations in the first aspect above.

In some embodiments, a location information processing method comprises: obtaining transaction information from user terminals of a plurality of users using a service provided by a service provider, the transaction information comprising a plurality of pieces of location information of the user terminals; clustering, using an algorithm, the plurality of pieces of location information into a plurality of areas; determining a transaction attribute corresponding to each area in the plurality of areas, the transaction attribute comprising a number of users in a corresponding area and a number of transactions of users using the service in the corresponding area; determining, according to information entropy values of the transaction attributes, a dispersity of the service provided by the service provider according to a number of areas in the plurality of areas and a plurality of transaction attributes corresponding to the plurality of areas; and determining, according to the dispersity, whether the plurality of users are geographically concentrated or randomly dispersed.

In one embodiment, the obtaining transaction information from user terminals of a plurality of users using a service provided by a service provider comprises: obtaining transaction information from the user terminals of the plurality of users using the service provided by the service provider within a pre-determined period.

In one embodiment, before the clustering the plurality of pieces of location information into a plurality of areas, the method further comprises: removing location information exceeding a pre-determined range from the plurality of pieces of location information.

In one embodiment, the algorithm comprises: a GEOHASH algorithm or a DBSCAN algorithm.

In one embodiment, the determining a service dispersity of the service provided by the service provider comprises determining the service dispersity using the following equation:

$$\text{Spread}(b_i) = \frac{\sum_{i=1}^{m} -\frac{b_i}{\sum_{j=1}^{m} b_j} * \ln\left(\frac{b_i}{\sum_{j=1}^{m} b_j}\right)}{\ln(m)}$$

wherein $\text{Spread}(b_i)$ represents the service dispersity, $i, j=1, \ldots, m$, $m$ represents the number of areas, $b_i$ represents a transaction attribute corresponding to the $i^{th}$ area, and $b_j$ represents a transaction attribute corresponding to the $j^{th}$ area.

In one embodiment, the determining a service dispersity of the service provided by the service provider comprises determining the service dispersity using the following equation:

$$\text{Spread}(b_i) = \frac{1 - \sum_{i=1}^{m} \left(\frac{b_i}{\sum_{j=1}^{m} b_j}\right)^2}{1 - \frac{1}{m}}$$

wherein $\text{Spread}(b_i)$ represents the service dispersity, $i, j=1, \ldots, m$, $m$ represents the number of areas, $b_i$ represents a transaction attribute corresponding to the $i^{th}$ area, and $b_j$ represents a transaction attribute corresponding to the $j^{th}$ area.

In one embodiment, the location information comprises latitude and longitude information.

The specification also provides a non-transitory computer-readable storage medium, which, according to some embodiments, stores instructions executable by one or more processors to cause the one or more processors to perform operations comprising: obtaining transaction information from user terminals of a plurality of users using a service provided by a service provider, the transaction information comprising a plurality of pieces of location information of the user terminals; clustering, using an algorithm, the plurality of pieces of location information into a plurality of areas; determining a transaction attribute corresponding to each area in the plurality of areas, the transaction attribute comprising a number of users in a corresponding area and a number of transactions of users using the service in the corresponding area; determining, according to information entropy values of the transaction attributes, a dispersity of the service provided by the service provider according to a number of areas in the plurality of areas and a plurality of transaction attributes corresponding to the plurality of areas; and determining, according to the dispersity, whether the plurality of users are geographically concentrated or randomly dispersed.

The specification also provides a system, which, according to some embodiments, comprises one or more processors and one or more non-transitory computer-readable storage media storing instructions executable by the one or more processors, wherein execution of the instructions causes the one or more processors to perform operations comprising: obtaining transaction information from user terminals of a plurality of users using a service provided by a service provider, the transaction information comprising a plurality of pieces of location information of the user terminals; clustering, using an algorithm, the plurality of pieces of location information into a plurality of areas; determining a transaction attribute corresponding to each area in the plurality of areas, the transaction attribute comprising a number of users in a corresponding area and a number of transactions of users using the service in the corresponding area; determining, according to information entropy values of the transaction attributes, a dispersity of the service provided by the service provider according to a number of areas in the plurality of areas and a plurality of transaction attributes corresponding to the plurality of areas; and determining, according to the dispersity, whether the plurality of users are geographically concentrated or randomly dispersed.

According to the location information processing method of the specification, transaction information of a plurality of users using a service provided by a service provider is obtained, a plurality of pieces of location information of the plurality of users included in the transaction information are clustered into at least one area, and a transaction attribute corresponding to each area in the at least one area is determined. Then, a service dispersity of the service provided by a service provider is determined according to the number of areas and transaction attributes corresponding to respective areas, thereby achieving efficient and reliable identification of the real environment of an offline service provider using a payment two-dimensional code thereof.

BRIEF DESCRIPTION OF THE DRAWINGS

To more clearly describe the technical solutions of multiple embodiments disclosed by the specification, the accompanying drawings to be used in the description of the embodiments will be briefly introduced. Apparently, the accompanying drawings in the description below are merely multiple embodiments disclosed by the specification. To those skilled in the art, other drawings may be obtained based on these accompanying drawings without creative effort.

DETAILED DESCRIPTION

Multiple embodiments disclosed by the specification will be described below with reference to the accompanying drawings.

Figure 1:
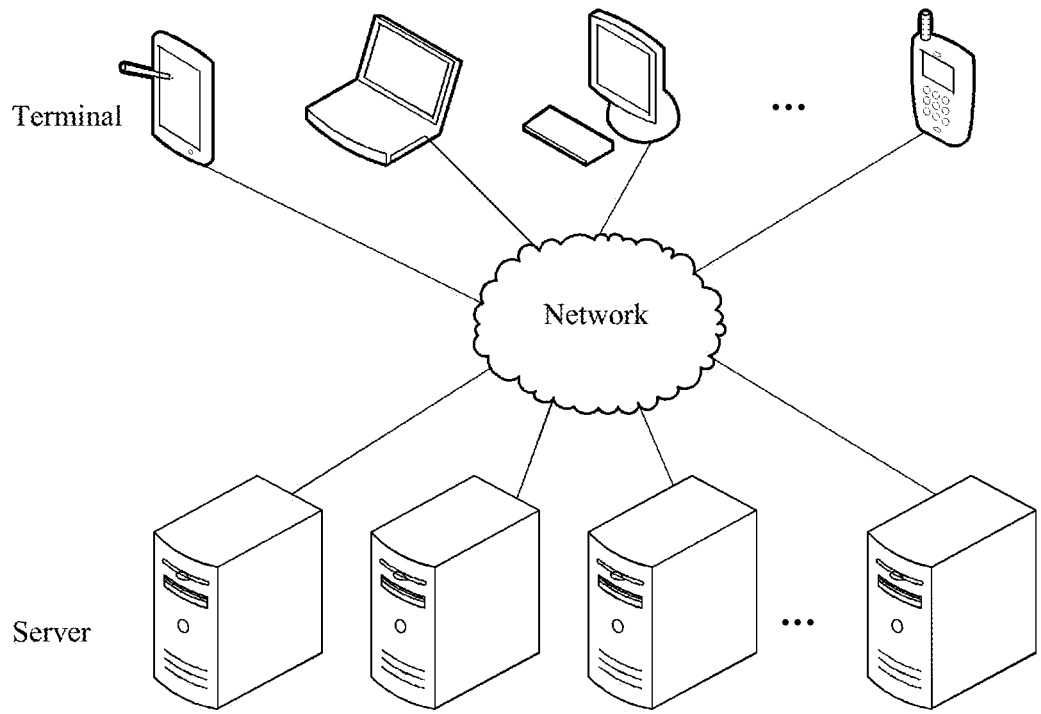
FIG. 1 is a schematic diagram of an application scenario of a location information processing method according to some embodiments disclosed by the specification.

FIG. 1 is a schematic diagram of an application scenario of a location information processing method according to some embodiments disclosed by the specification. The entity that implements the method may be a server. In FIG. 1, the server (e.g., the server may be a server of an Alipay application) obtains transaction information (e.g., the transaction information may comprise location information of the user) of a plurality of users using a service (e.g., the service may be a product service) provided by a service provider (e.g., the service provider may be an offline service provider that provides a two-dimensional code of the service provider to the user), and then employs the location information processing method according to multiple embodiments disclosed by the specification to cluster (e.g., the clustering may be implemented by using the GEOHASH algorithm) the obtained plurality of pieces of location information (e.g., the location information may be latitude and longitude information of a user terminal) into at least one area (e.g., the at least one area may comprise a plurality of areas having different area numbers). Then, the server determines a transaction attribute (e.g., the transaction attribute may comprise the number of users in a corresponding area) corresponding to each area, and determines service dispersity (e.g., the lower the service dispersity, the more likely the service provider uses the payment two-dimensional code thereof in a legal manner; otherwise, the less likely the service provider uses the payment two-dimensional code thereof in a legal manner) according to the number of areas and transaction attributes corresponding to respective areas.

According to the location information processing method disclosed by the specification, transaction information of a plurality of users using a service provided by a service provider is obtained, a plurality of pieces of location information of the plurality of users included in the transaction information are clustered into at least one area, and a transaction attribute corresponding to each of the at least one area is determined. Then, a service dispersity of the service provided by the service provider is determined according to the number of areas and transaction attributes corresponding to respective areas, thereby achieving efficient and reliable identification of the real environment that an offline service provider using a payment two-dimensional code thereof.

Figure 2:
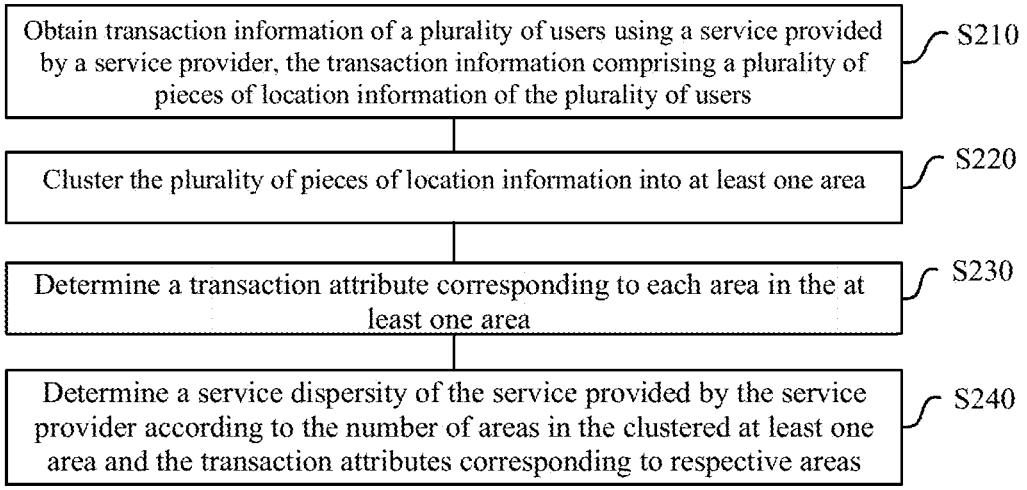
FIG. 2 is a flow chart of a location information processing method according to some embodiments disclosed by the specification.

FIG. 2 is a flow chart of a location information processing method according to some embodiments of the specification. The entity that implements the method may be a device having processing capabilities: a server, a system, an apparatus, or a software platform, such as the server in FIG. 1. As shown in FIG. 2, the method includes, for example, the following steps.

In Step S210, transaction information of a plurality of users using a service provided by a service provider is obtained, the transaction information including a plurality of pieces of location information of the plurality of users. In some embodiments, S210 comprises obtaining transaction information from user terminals of a plurality of users using a service provided by a service provider, the transaction information comprising a plurality of pieces of location information of the user terminals.

For example, the service provider may provide a payment two-dimensional code of the service provider to a user. The user may use a terminal to scan the payment two-dimensional code of the service provider and complete the payment to the service the user used. Accordingly, the server obtains transaction information of a plurality of users using the service provided by the service provider, and the transaction information includes a plurality of pieces of location information of the plurality of users. Here, the plurality of pieces of location information may be location information collected from a plurality of terminals of the plurality of users via the Location Based Service (LBS), and the location information may include latitude and longitude information.

In some embodiments, the obtaining transaction information of a plurality of users using a service provided by a service provider may include: obtaining transaction information of the plurality of users using a service provided by the service provider within a pre-determined period. Here, the pre-determined period may be any pre-set time period, e.g., within the latest one week, within the latest one month, or the like.

The transaction information may further include a service provider identifier of the service provider (e.g., a name of the service provider, a social credit code of the service provider, a service provider number in the server, and the like), a user identifier of the user (e.g., a telephone number, an ID number, a user number in the server, and the like), and an order ID of the transaction.

In some embodiments, the transaction information of a user using a service provided by a service provider may include: latitude and longitude information of the user (e.g., a latitude of 39° 54'25.70" north and a longitude of 116° 23'28.49" east), a telephone number of the user (e.g., 12312345678), a social credit code of the service provider (e.g., 911101086615511250), and an order ID (e.g., 123454321).

In Step S220, the plurality of pieces of location information are clustered into at least one area. In some embodiments, S220 comprises clustering, using an algorithm, the plurality of pieces of location information into a plurality of areas.

For example, a clustering algorithm is used to cluster the plurality of pieces of location information into at least one area. Here, the clustering algorithm may be the GEOHASH algorithm or DBSCAN (Density-based spatial clustering of applications with noise) algorithm, which is not limited in the specification.

In some embodiments, the GEOHASH algorithm is used to convert the plurality of pieces of location information into a GEOHASH grid, and determine a grid number for each piece of the location information.

Figure 3:
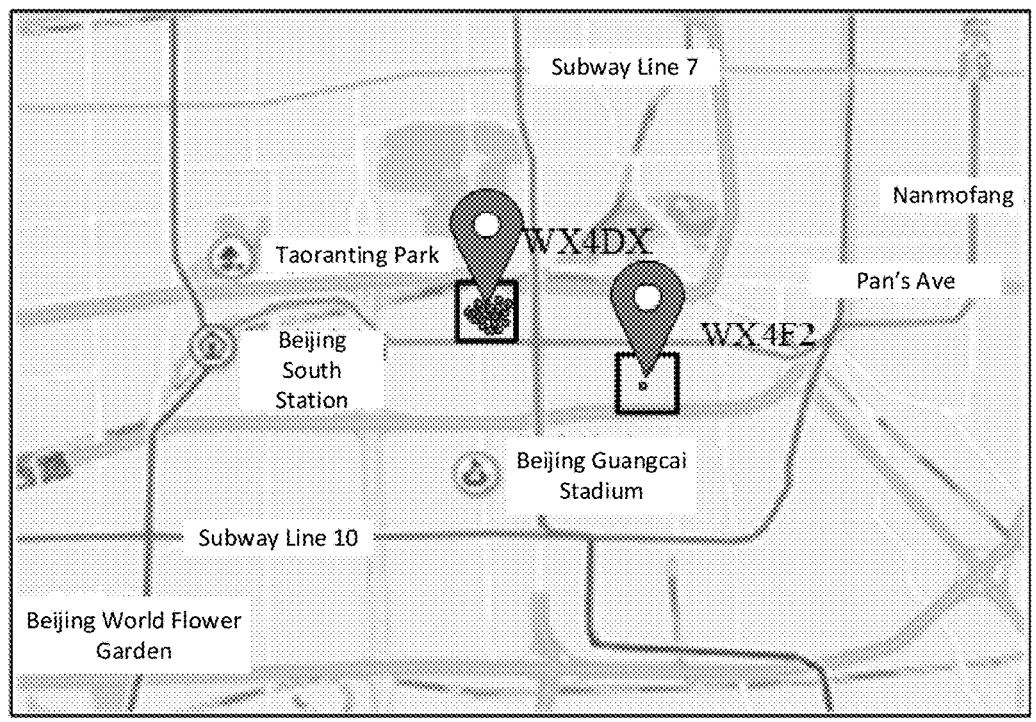
FIG. 3 is a schematic diagram of clustering location information into an area according to some embodiments disclosed by the specification.

For example, the transaction information obtained from the server in Step S210 comprises 100 latitude and longitude coordinates. After the GEOHASH algorithm is used to convert the 100 latitude and longitude coordinates into a GEOHASH grid, as shown in FIG. 3, the grid numbers of 99 latitude and longitude coordinates thereof are WX4DX, and the grid number of the remaining 1 latitude and longitude coordinate is WX4F2. In this way, the above 100 pieces of location information are clustered into two areas.

Figure 4:
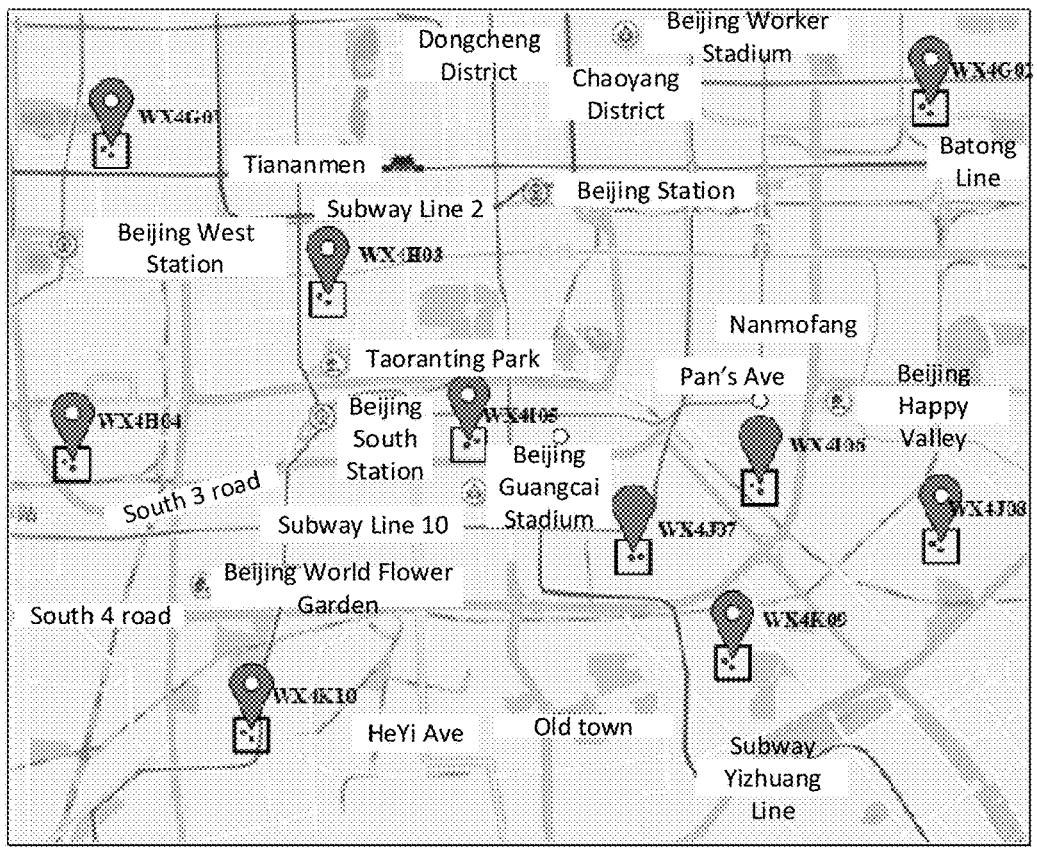
FIG. 4 is another schematic diagram of clustering location information into an area according to some embodiments disclosed by the specification.

For another example, the transaction information obtained from the server in Step S210 comprises 20 latitude and longitude coordinates. After the GEOHASH algorithm is used to convert the 20 latitude and longitude coordinates into a GEOHASH grid, as shown in FIG. 4, every two latitude and longitude coordinates have the same the grid number, and the obtained 10 grid numbers are, WX4G01, WX4G02, WX4H03, WX4H04, WX4I05, WX4I06, WX4J07, WX4J08, WX4K09, and WX4K10, respectively. In this way, the above 20 pieces of location information are clustered into 10 areas.

In some other embodiments, the DBSCAN algorithm is used to cluster the plurality of pieces of location information, and determine an area number for each piece of the location information. The DBSCAN algorithm is a clustering algorithm based on density. Unlike partitioning and hierarchical clustering methods, this algorithm defines a cluster to be a maximum set of densely connected points, which can partition an area of a high enough density into clusters and can identify clusters of any shape in a space database with noise. For example, according to the DBSCAN algorithm, all location points are first marked as core points, border points, or noise points, and the noise points thereof are deleted. Then, a side is assigned between all core points with a distance within a preset parameter, each group of connected core points forms a cluster, and each border point is allocated into one cluster of a core point associated therewith, thereby completing the clustering of location points.

It should be understood that the precision of areas (e.g., a size of an area) obtained from clustering may be controlled by adjusting parameters of a clustering algorithm. For example, an encoding bit number for encoding location information in the GEOHASH algorithm may be controlled to control the precision of areas. In one example, the higher the encoding bit number of location information, the more precise the obtained area range is. In another example, the precision of areas may be controlled by controlling the length of neighboring area radius E in the DBSCAN algorithm. In one example, the smaller the value of the input neighboring area radius E, the more precise the obtained area range is.

Then, in Step S230, determine a transaction attribute corresponding to each area in the at least one area. In some embodiments, S230 comprises determining a transaction attribute corresponding to each area in the plurality of areas, the transaction attribute comprising a number of users in a corresponding area and a number of transactions of users using the service in the corresponding area.

For example, the server determines a transaction attribute corresponding to each area, and the transaction attribute may comprise the number of transactions of users using the service in the corresponding area. In one example, the server may determine the number of transactions according to the amount of transaction information. Alternatively, the transaction information obtained in Step S210 may comprise an order number of a transaction, and accordingly, the server may determine the number of transactions corresponding to each area according to the number of order numbers.

In one example, a plurality of pieces of location information are clustered into two areas in Step S220, the number of order numbers corresponding to one of the areas is 99, and the number of order numbers corresponding to the other areas is 1. Accordingly, it may be determined that the numbers of transactions corresponding to these two areas are 99 and 1, respectively.

In some embodiments, the transaction attribute may comprise the number of users in a corresponding area. For example, the transaction information obtained in Step S210 may comprise a user identifier of a user, and the server may determine the number of users corresponding to each area according to the number of different user identifiers.

In one example, a plurality of pieces of location information are clustered into 10 areas in Step S220, the number of different user identifiers corresponding to each of the areas is 2. Accordingly, it may be determined that the number of users corresponding to each of the areas is 2.

After the location information is clustered into at least one area in Step S220, and after the transaction attribute corresponding to each area is determined in Step S230, subsequently in Step S240, determine a service dispersity of the service provided by the service provider according to the number of areas in the clustered at least one area and the transaction attributes corresponding to respective areas.

In some embodiments, S240 comprises determining, according to information entropy values of the transaction attributes, a dispersity of the service provided by the service provider according to a number of areas in the plurality of areas and a plurality of transaction attributes corresponding to the plurality of areas; and determining, according to the dispersity, whether the plurality of users are geographically concentrated or randomly dispersed.

For example, the transaction attribute may comprise the number of transactions and/or the number of users. Accordingly, the service dispersity of the service provided by the service provider may be determined according to the number of areas and the number of transactions corresponding to each area. Alternatively, the service dispersity of the service provided by the service provider may be determined according to the number of areas and the number of users corresponding to each area. Alternatively, a first service dispersity may be determined according to the number of areas and the number of transactions corresponding to each area, and a second service dispersity may be determined according to the number of areas and the number of users corresponding to each area. Then, the service dispersity of the service provided by the service provider may be determined in a comprehensive manner by combining the first service dispersity and the second service dispersity (e.g., the service dispersity may be equal to an average of the first service dispersity and the second service dispersity). Furthermore, the real environment of the service provider using the payment two-dimensional code thereof may be determined according to the service dispersity. It is more likely that the service provider uses the payment two-dimensional code thereof in a legal manner if the determined service dispersity is lower. The risk of the service provider using the payment two-dimensional code thereof in an illegal manner is higher if the determined service dispersity is higher.

In some embodiments, the determining a service dispersity of the service provided by the service provider may comprise: determining, according to information entropy values of the transaction attributes, the service dispersity of the service provided by the service provider.

Here, the equation for calculating information entropy values may be as follows:

$$H(b_i) = \sum_{i=1}^{m} -\frac{b_i}{\sum_{j=1}^{m} b_j} * \ln\left(\frac{b_i}{\sum_{j=1}^{m} b_j}\right) \quad (1)$$

In the equation above, $H(b_i)$ represents an information entropy value of a transaction attribute, i, j=1, ..., m, m represents the number of areas, $b_i$ represents a transaction attribute corresponding to the $i^{th}$ area, and $b_j$ represents a transaction attribute corresponding to the $j^{th}$ area.

In some embodiments, the service dispersity of the service may be calculated, according to the calculation method for information entropy values, by using the following equation:

$$\text{Spread}(b_i) = \frac{\sum_{i=1}^{m} -\frac{b_i}{\sum_{j=1}^{m} b_j} * \ln\left(\frac{b_i}{\sum_{j=1}^{m} b_j}\right)}{\ln(m)} \quad (2)$$

In the equation above, $\text{Spread}(b_i)$ represents the service dispersity, $\text{Spread}(b_i) \in [0,1]$, j=1, ..., m, m represents the number of areas, $b_i$ represents a transaction attribute corresponding to the $i^{th}$ area, and $b_j$ represents a transaction attribute corresponding to the $j^{th}$ area.

Furthermore, the real environment of the service provider using the payment two-dimensional code thereof may be determined according to the service dispersity that is calculated according to Equation (2). For example, when the resulted service dispersity approximates more closely to 1 and the average transaction attribute on each area is smaller than a predetermined value (e.g., 3), it indicates that users of the service are more dispersed and more random, and then it is very likely that the service provider uses the two-dimensional code thereof outside of its offline stores. Therefore, the risk of the service provider using the payment two-dimensional code thereof in an illegal manner is higher. When the resulted service dispersity approximates more closely to 0, it indicates that users of the service are more concentrated, and it is more likely that the service provider uses the payment two-dimensional code thereof in a legal manner.

In one example, the transaction attribute may include the number of transactions, then $b_i$ and $b_j$ represent the number of transactions corresponding to the $i^{th}$ area and the $j^{th}$ area, respectively, and a predetermined value of an average number of transactions is 3. For example, the location information is clustered into two areas in Step S220, and it is determined in Step S230 that the numbers of transactions corresponding to these two areas are 99 and 1, respectively, i.e., m=2, and $b_1$=99, $b_2$=1. Accordingly, the service dispersity obtained according to Equation (2) is 0.08, and therefore, the possibility that the service provider uses the payment two-dimensional code thereof in a legal manner is high.

In another example, the transaction attribute may include the number of users, then $b_i$ and $b_j$ represent the number of users corresponding to the $i^{th}$ area and the $j^{th}$ area, respectively, and a predetermined value of an average number of users is 3. For example, the location information is clustered into 10 areas in Step S220, and it is determined in Step S230 that the numbers of users corresponding to these 10 areas are all 2, i.e., m=10, and $b_i$=2, i=1, . . . , 10. Accordingly, the service dispersity obtained according to Equation (2) is 1, and the average transaction attribute is 2 (<3). The risk of the service provider using the payment two-dimensional code thereof in an illegal manner is high.

In some other embodiments, determining a service dispersity of the service provided by the service provider may include: inputting the transaction attributes and the number of areas into Equation (3) based on a calculation principle of Gini coefficient, and using an output result as the service dispersity.

$$\text{Spread}(b_i) = \frac{1 - \sum_{i=1}^{m}\left(\frac{b_i}{\sum_{j=1}^{m} b_j}\right)^2}{1 - \frac{1}{m}} \quad (3)$$

In the equation above, Spread($b_i$) represents the service dispersity, Spread($b_i$)∈[0,1], j=1, . . . , m, m represents the number of areas, $b_i$ represents a transaction attribute corresponding to the $i^{th}$ area, and $b_j$ represents a transaction attribute corresponding to the $j^{th}$ area.

The above description of the process of determining the service dispersity according to Equation (2) may be referenced for the process of determining the service dispersity according to Equation (3), which will not be elaborated herein.

Before Step S220, the method may further comprise: removing location information exceeding a pre-determined range from the location information of users. Accordingly, Step S220 may comprise: after the location information exceeding the pre-determined range is removed from the location information obtained in Step S210, clustering the remaining location information into at least one area.

In one example, the location information comprises latitude and longitude information, and the pre-determined range of location information covers: a longitude range of [480°, 180°] and a latitude range of [−90°, 90°]. For example, the location information obtained in Step S210 comprises the latitude and longitude of (200°,50°), which is then removed from the obtained location information.

In addition, in Step S240, Equation (1) may be used directly to calculate the service dispersity of the service provided by the service provider. Accordingly, for a service provider with a high number of areas, the upper limit of the service dispersity for determining whether the service provider uses the two-dimensional code thereof in a legal manner is increased correspondingly.

According to the location information processing method of multiple embodiments disclosed by the specification, transaction information of a plurality of users using a service provided by a service provider is obtained, a plurality of pieces of location information of the plurality of users included in the transaction information are clustered into at least one area, and a transaction attribute corresponding to each area in the at least one area is determined. Then, a service dispersity of the service provided by a service provider is determined according to the number of areas and transaction attributes corresponding to respective areas, thereby achieving efficient and reliable identification of the real environment of an offline service provider using a payment two-dimensional code thereof.

Figure 5:
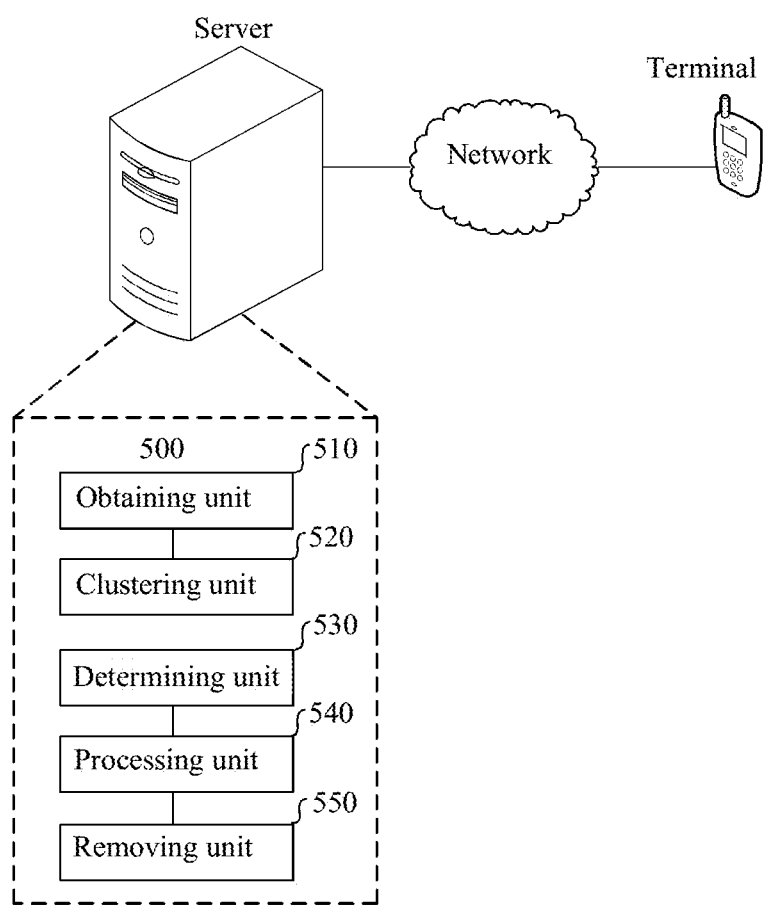
FIG. 5 is a schematic structural diagram of a location information processing apparatus according to some embodiments disclosed by the specification.

Corresponding to the above-described location information processing method, multiple embodiments disclosed by the specification further provide a location information processing apparatus 500. As shown in FIG. 5, the apparatus 500 comprises: an obtaining unit 510 configured to obtain transaction information of a plurality of users using a service provided by a service provider, the transaction information comprising a plurality of pieces of location information of the plurality of users; a clustering unit 520 configured to cluster the plurality of pieces of location information into at least one area; a determining unit 530 configured to determine a transaction attribute corresponding to each area in the at least one area, the transaction attribute comprising the number of users in a corresponding area and/or the number of transactions of users using the service in the corresponding area; and a processing unit 540 configured to determine a service dispersity of the service provided by the service provider according to the number of areas in the at least one area and the transaction attributes corresponding to respective areas.

In a possible design, the obtaining unit 510 is configured to, for example, obtain transaction information of the users using a service provided by the service provider within a pre-determined period.

In a possible design, the apparatus 500 further comprises: a removing unit 550 configured to remove location information exceeding a pre-determined range from the location information.

In a possible design, the clustering unit 520 is configured to, for example, use the GEOHASH algorithm or DBSCAN algorithm to cluster the plurality of pieces of location information into at least one area.

In a possible design, the processing unit 540 is configured to, for example, determine, according to information entropy values of the transaction attributes, the service dispersity of the service provided by the service provider.

In a possible design, the processing unit 540 is configured to determine the service dispersity using the following equation:

$$\text{Spread}(b_i) = \frac{\sum_{i=1}^{m} -\frac{b_i}{\sum_{j=1}^{m} b_j} * \ln\left(\frac{b_i}{\sum_{j=1}^{m} b_j}\right)}{\ln(m)}$$

where Spread($b_i$) represents the service dispersity, i, j=1, . . . , m, m represents the number of areas, $b_i$ represents a transaction attribute corresponding to the $i^{th}$ area, and $b_j$ represents a transaction attribute corresponding to the $j^{th}$ area.

In a possible design, the processing unit 540 is configured to determine the service dispersity using the following equation:

$$\text{Spread}(b_i) = \frac{1 - \sum_{i=1}^{m}\left(\frac{b_i}{\sum_{j=1}^{m} b_j}\right)^2}{1 - \frac{1}{m}}$$

where Spread($b_i$) represents the service dispersity, i, j=1, ..., m, m represents the number of areas, $b_i$ represents a transaction attribute corresponding to the $i^{th}$ area, and $b_j$ represents a transaction attribute corresponding to the $j^{th}$ area.

In a possible design, the location information obtained by the obtaining unit 510 comprises latitude and longitude information.

According to the location information processing apparatus of multiple embodiments disclosed by the specification, the obtaining unit 510 obtains transaction information of a plurality of users using a service provided by a service provider, the clustering unit 520 clusters a plurality of pieces of location information of the plurality of users included in the transaction information into at least one area, and the determining unit 530 determines a transaction attribute corresponding to each area in the at least one area. Then, the processing unit 540 determines a service dispersity of the service provided by a service provider according to the number of areas and transaction attributes corresponding to respective areas, thereby achieving efficient and reliable identification of the real environment of an offline service provider using a payment two-dimensional code thereof.

In some embodiments, the various units of the apparatus 500 may be implemented as software instructions or a combination of software and hardware. For example, the apparatus 500 (or referred to as a system) may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the apparatus 500 may include a server, a mobile phone, a tablet computer, a PC, a laptop computer, another computing device, or a combination of one or more of these computing devices.

In some embodiments, the apparatus 500 comprises one or more processors and one or more non-transitory computer-readable storage media storing instructions executable by the one or more processors, wherein execution of the instructions causes the one or more processors to perform operations comprising: obtaining transaction information from user terminals of a plurality of users using a service provided by a service provider, the transaction information comprising a plurality of pieces of location information of the user terminals; clustering, using an algorithm, the plurality of pieces of location information into a plurality of areas; determining a transaction attribute corresponding to each area in the plurality of areas, the transaction attribute comprising a number of users in a corresponding area and a number of transactions of users using the service in the corresponding area; determining, according to information entropy values of the transaction attributes, a dispersity of the service provided by the service provider according to a number of areas in the plurality of areas and a plurality of transaction attributes corresponding to the plurality of areas; and determining, according to the dispersity, whether the plurality of users are geographically concentrated or randomly dispersed.

Those skilled in the art should be aware that, in the above-described one or more examples, the functions described in multiple embodiments disclosed by the specification may be implemented by hardware, software, firmware, or any combination thereof. When implemented by software, these functions may be stored in a computer readable medium or transmitted as one or more instructions or code on the computer readable medium.

The above-described embodiments further describe in detail the objectives, technical solutions and advantageous effects of multiple embodiments disclosed by the specification. It should be understood that the description above is merely implementation manners of multiple embodiments disclosed by the specification, and is not used to limit the protection scope of multiple embodiments disclosed by the specification. Any modification, equivalent substitution, and improvement made on the basis of the technical solutions of multiple embodiments disclosed by the specification shall fall within the protection scope of multiple embodiments disclosed by the specification.

The invention claimed is:

1. A location information processing method, comprising:
    scanning, by a plurality of user terminals, a two-dimensional code or a barcode provided by a service provider;
    collecting, by a server from the plurality of user terminals, a plurality of location coordinates of the plurality of user terminals when the plurality of user terminals scan the two-dimensional code or the barcode;
    clustering, by the server using a computer algorithm, the plurality of location coordinates into a plurality of areas;
    determining, by the server, a transaction attribute corresponding to each area in the plurality of areas, the transaction attribute comprising a number of users in a corresponding area and a number of transactions of users using the service in the corresponding area;
    determining, by the server according to information entropy values of the transaction attributes, a dispersity numerical value of the service provided by the service provider according to a number of areas in the plurality of areas and a plurality of transaction attributes corresponding to the plurality of areas; and
    determining, by the server according to the dispersity numerical value, whether the two-dimensional code or the barcode was scanned offline or online by the plurality of user terminals.

2. The method according to claim 1, wherein the collecting, from a plurality of user terminals, a plurality of location coordinates comprises:
    collecting, from the plurality of user terminals, the plurality of location coordinates via a Location Based Service.

3. The method according to claim 1, wherein, before the clustering the plurality of location coordinates into a plurality of areas, the method further comprises:
    removing location coordinates exceeding a pre-determined range from the plurality of location coordinates.

4. The method according to claim 1, wherein the computer algorithm comprises:
    a GEOHASH algorithm or a DBSCAN algorithm.

5. The method according to claim 1, wherein the determining a dispersity numerical value of the service provided by the service provider comprises determining the dispersity numerical value using the following equation:

$$\text{Spread}(b_i) = \frac{\sum_{i=1}^{m} -\frac{b_i}{\sum_{j=1}^{m} b_j} * \ln\left(\frac{b_i}{\sum_{j=1}^{m} b_j}\right)}{\ln(m)}$$

wherein Spread($b_i$) represents the dispersity numerical value, i,j=1, . . . , m, m represents the number of areas, $b_i$ represents a transaction attribute corresponding to the $i^{th}$ area, and $b_j$ represents a transaction attribute corresponding to the $j^{th}$ area, and wherein the information entropy values of the transaction attributes are represented by $$\sum_{i=1}^{m} -\frac{b_i}{\sum_{j=1}^{m} b_j} * \ln\left(\frac{b_i}{\sum_{j=1}^{m} b_j}\right).$$

6. The method according to claim 1, wherein the determining a dispersity numerical value of the service provided by the service provider comprises determining the dispersity numerical value using the following equation:

$$\text{Spread}(b_i) = \frac{1 - \sum_{i=1}^{m}\left(\frac{b_i}{\sum_{j=1}^{m} b_j}\right)^2}{1 - \frac{1}{m}}$$

wherein Spread($b_i$) represents the dispersity numerical value, i,j=1, . . . , m, m represents the number of areas, $b_i$ represents a transaction attribute corresponding to the $i^{th}$ area, and $b_j$ represents a transaction attribute corresponding to the $j^{th}$ area.

7. The method according to claim 1, wherein the plurality of location coordinates comprise latitude and longitude information.

8. One or more non-transitory computer-readable storage media storing instructions executable by one or more processors, wherein execution of the instructions causes the one or more processors to perform operations comprising:
   scanning, respectively at a plurality of user terminals, a two-dimensional code or a barcode provided by a service provider;
   collecting, from the plurality of user terminals, a plurality of location coordinates of the plurality of user terminals when the plurality of user terminals respectively scan the two-dimensional code or the barcode;
   clustering, using a computer algorithm, the plurality of location coordinates into a plurality of areas;
   determining a transaction attribute corresponding to each area in the plurality of areas, the transaction attribute comprising a number of users in a corresponding area and a number of transactions of users using the service in the corresponding area;
   determining, according to information entropy values of the transaction attributes, a dispersity numerical value of the service provided by the service provider according to a number of areas in the plurality of areas and a plurality of transaction attributes corresponding to the plurality of areas; and
   determining, according to the dispersity numerical value, whether the two-dimensional code or the barcode was scanned offline or online by the plurality of user terminals.

9. The one or more non-transitory computer-readable storage media according to claim 8, wherein the collecting, from the plurality of user terminals, a plurality of location coordinates comprises:
   collecting, from the plurality of user terminals, the plurality of location coordinates via a Location Based Service.

10. The one or more non-transitory computer-readable storage media according to claim 8, wherein, before the clustering the plurality of location coordinates into a plurality of areas, the operations further comprise:
   removing location coordinates exceeding a pre-determined range from the plurality of location coordinates.

11. The one or more non-transitory computer-readable storage media according to claim 8, wherein the computer algorithm comprises:
   a GEOHASH algorithm or a DBSCAN algorithm.

12. The one or more non-transitory computer-readable storage media according to claim 8, wherein the determining a dispersity numerical value of the service provided by the service provider comprises determining the dispersity numerical value using the following equation:

$$\text{Spread}(b_i) = \frac{\sum_{i=1}^{m} -\frac{b_i}{\sum_{j=1}^{m} b_j} * \ln\left(\frac{b_i}{\sum_{j=1}^{m} b_j}\right)}{\ln(m)}$$

wherein Spread($b_i$) represents the dispersity numerical value, i,j=1, . . . , m, m represents the number of areas, $b_i$ represents a transaction attribute corresponding to the $i^{th}$ area, and $b_j$ represents a transaction attribute corresponding to the $j^{th}$ area, and wherein the information entropy values of the transaction attributes are represented by $$\sum_{i=1}^{m} -\frac{b_i}{\sum_{j=1}^{m} b_j} * \ln\left(\frac{b_i}{\sum_{j=1}^{m} b_j}\right).$$

13. The one or more non-transitory computer-readable storage media according to claim 8, wherein the determining a dispersity numerical value of the service provided by the service provider comprises determining the dispersity numerical value using the following equation:

$$\text{Spread}(b_i) = \frac{1 - \sum_{i=1}^{m}\left(\frac{b_i}{\sum_{j=1}^{m} b_j}\right)^2}{1 - \frac{1}{m}}$$

wherein Spread($b_i$) represents the dispersity numerical value, i,j=1, . . . , m, m represents the number of areas, $b_i$ represents a transaction attribute corresponding to the $i^{th}$ area, and $b_j$ represents a transaction attribute corresponding to the $j^{th}$ area.

14. The one or more non-transitory computer-readable storage media according to claim 8, wherein the plurality of location coordinates comprise latitude and longitude information.

15. A system, comprising one or more processors and one or more non-transitory computer-readable storage media storing instructions executable by the one or more processors, wherein execution of the instructions causes the one or more processors to perform operations comprising:

scanning, respectively at a plurality of user terminals, a two-dimensional code or a barcode provided by a service provider;

collecting, from the plurality of user terminals, a plurality of location coordinates of the plurality of user terminals when the plurality of user terminals respectively scan the two-dimensional code or the barcode;

clustering, using a computer algorithm, the plurality of location coordinates into a plurality of areas;

determining a transaction attribute corresponding to each area in the plurality of areas, the transaction attribute comprising a number of users in a corresponding area and a number of transactions of users using the service in the corresponding area;

determining, according to information entropy values of the transaction attributes, a dispersity numerical value of the service provided by the service provider according to a number of areas in the plurality of areas and a plurality of transaction attributes corresponding to the plurality of areas; and determining, according to the dispersity numerical value, whether the two-dimensional code or the barcode was scanned offline or online by the plurality of user terminals.

16. The system according to claim 15, wherein the collecting, from a plurality of user terminals, a plurality of location coordinates comprises:

collecting, from the plurality of user terminals, the plurality of location coordinates via a Location Based Service.

17. The system according to claim 15, wherein, before the clustering the plurality of location coordinates into a plurality of areas, the operations further comprise:

removing location coordinates exceeding a pre-determined range from the plurality of location coordinates.

18. The system according to claim 15, wherein the computer algorithm comprises:

a GEOHASH algorithm or a DBSCAN algorithm.

19. The system according to claim 15, wherein the determining a dispersity numerical value of the service provided by the service provider comprises determining the dispersity numerical value using the following equation:

$$\text{Spread}(b_i) = \frac{\sum_{i=1}^{m} -\frac{b_i}{\sum_{j=1}^{m} b_j} * \ln\left(\frac{b_i}{\sum_{j=1}^{m} b_j}\right)}{\ln(m)}$$

wherein Spread($b_i$) represents the service dispersity numerical value, i,j=1, ..., m, m represents the number of areas, $b_i$ represents a transaction attribute corresponding to the $i^{th}$ area, and $b_j$ represents a transaction attribute corresponding to the $j^{th}$ area, and wherein the information entropy values of the transaction attributes are represented by $$\sum_{i=1}^{m} -\frac{b_i}{\sum_{j=1}^{m} b_j} * \ln\left(\frac{b_i}{\sum_{j=1}^{m} b_j}\right).$$

20. The system according to claim 15, wherein the determining a dispersity numerical value of the service provided by the service provider comprises determining the dispersity numerical value using the following equation:

$$\text{Spread}(b_i) = \frac{1 - \sum_{i=1}^{m} \left(\frac{b_i}{\sum_{j=1}^{m} b_j}\right)^2}{1 - \frac{1}{m}}$$

wherein Spread($b_i$) represents the dispersity numerical value, i,j=1, ..., m, m represents the number of areas, $b_i$ represents a transaction attribute corresponding to the $i^{th}$ area, and $b_j$ represents a transaction attribute corresponding to the $j^{th}$ area.

* * * * *